(12) United States Patent  
Fuchiwaki et al.

(10) Patent No.: US 11,151,115 B2  
(45) Date of Patent: Oct. 19, 2021

(54) INFORMATION LINKAGE SYSTEM AND INFORMATION MANAGEMENT METHOD

(71) Applicant: Hitachi, Ltd., Tokyo (JP)

(72) Inventors: Makoto Fuchiwaki, Tokyo (JP); Jiyun Yoshihara, Tokyo (JP); Shinichiro Saito, Tokyo (JP); Tomoya Kuga, Tokyo (JP); Kozo Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 16/815,667

(22) Filed: Mar. 11, 2020

(65) Prior Publication Data

US 2020/0293510 A1 Sep. 17, 2020

(30) Foreign Application Priority Data

Mar. 15, 2019 (JP) .............................. JP2019-049187

(51) Int. Cl.
*G06F 16/00* (2019.01)
*G06F 16/23* (2019.01)
*G06F 16/901* (2019.01)
*G06F 16/22* (2019.01)

(52) U.S. Cl.
CPC .......... *G06F 16/2358* (2019.01); *G06F 16/22* (2019.01); *G06F 16/2365* (2019.01); *G06F 16/9024* (2019.01)

(58) Field of Classification Search
CPC .... G06F 15/173; G06F 2119/06; G06F 30/20; G06F 2111/02; G06F 9/468; G06F 30/00; G06F 30/367; G06F 8/427; G06F 9/4493; G06F 17/10; G06F 30/18; G06F 16/1827
See application file for complete search history.

(56) References Cited

U.S. PATENT DOCUMENTS

| | | | | |
|---|---|---|---|---|
| 2008/0129243 A1* | 6/2008 | Nashiki | ................. | H02K 1/246 318/701 |
| 2010/0148940 A1* | 6/2010 | Gelvin | ................. | H04L 67/12 340/286.02 |
| 2020/0074562 A1* | 3/2020 | Johnson | ................. | G06F 16/23 |

FOREIGN PATENT DOCUMENTS

WO WO 03/105002 A1 12/2003

* cited by examiner

*Primary Examiner* — Shyue Jiunn Hwa
(74) *Attorney, Agent, or Firm* — Crowell & Moring LLP

(57) ABSTRACT

It is provided an information linkage system, which is configured to allow a plurality of organizations to register and update data, and is formed of a computer including: a calculation device configured to execute predetermined calculation processing, to thereby implement the following functional modules; and a storage device accessible to the calculation device, the information linkage system comprising: an information linkage control module configured to receive a registration request for data, an update request for data, and an acquisition request for data from a plurality of external systems; an information linkage database in which data is allowed to be registered and updated; an information linkage database access module configured to access the information linkage database in response to a request received by the information linkage control module; and a reliability calculation module configured to calculate reliability information relating to the data stored in the information linkage database.

9 Claims, 13 Drawing Sheets

CONCEPT IMAGE OF INTER-ORGANIZATIONAL
INFORMATION LINKAGE PLATFORM SYSTEM
BASED ON PROPERTY VIEWING AS EXAMPLE

CONCEPT IMAGE OF INTER-ORGANIZATIONAL
INFORMATION LINKAGE PLATFORM SYSTEM
BASED ON PROPERTY VIEWING AS EXAMPLE

| X-ID | X-KEY | X-DATA ||
|---|---|---|---|
| | | NAME | AGE | ... |
| 0001 | *** | TARO UEDA | 20 | |

601

DB TABLE EXAMPLE OF ORGANIZATION X RELATING TO USER U

*Fig. 4A*

| Y-ID | Y-KEY | Y-DATA ||
|---|---|---|---|
| | | ADDRESS | ... |
| y@y.com | *** | @yyy | |

602

DB TABLE EXAMPLE OF ORGANIZATION Y RELATING TO USER U

*Fig. 4B*

| Z-ID | Z-DATA |||
|---|---|---|---|---|
| | LAST NAME | FIRST NAME | Z SERVICE USAGE COUNT | ... |
| 1801 | UEDA | TARO | 2 | |

603

DB TABLE EXAMPLE OF ORGANIZATION Z RELATING TO USER U

*Fig. 4C*

| PROVIDER | ORGANIZATION X | ORGANIZATION Y | ORGANIZATION Z | ... |
|---|---|---|---|---|
| RELIABILITY LEVEL | 0.1 | 0.8 | 0.5 | ... |

WHITE LIST

*Fig. 6*

| | ORGANIZATION X | ORGANIZATION Y | ORGANIZATION Z | ... |
|---|---|---|---|---|
| NAME | 0.1 | 0.8 | 0.8 | ... |
| ADDRESS | 0.1 | 0.8 | 0.8 | ... |
| PHONE NUMBER | 0.1 | 0.1 | 0.9 | ... |
| ⋮ | ⋮ | ⋮ | ⋮ | |

WHITE LIST

*Fig. 7*

| DATA TYPE | DATA VALUE | INPUT DATE/TIME | PROVIDER | DATA SOURCE | VERIFIED-BY-DATA-RELATED-PERSON | RELIABILITY LEVEL |
|---|---|---|---|---|---|---|
| | | | | | | |

*Fig. 8*

| PROVIDER COMPANY | NAME | ADDRESS | PHONE NUMBER | AGE | RAILROAD LINE BEING USED | RELIABILITY LEVEL | |
|---|---|---|---|---|---|---|---|
| ORGANIZATION X | | | | | | | |
| ORGANIZATION Y | | | | | | | |
| ORGANIZATION Z | | | | | | | |

*Fig. 9*

DATA OUTPUT SCREEN

NAME: U

PROVIDER COMPANY·ORGANIZATION X
RELIABILITY LEVEL:
ADDRESS:
PHONE NUMBER:
AGE:
RAILROAD LINE BEING USED:

PROVIDER COMPANY·ORGANIZATION Y
RELIABILITY LEVEL:
ADDRESS:
PHONE NUMBER:
AGE:
RAILROAD LINE BEING USED:

PROVIDER COMPANY·ORGANIZATION Z
RELIABILITY LEVEL:
ADDRESS:
PHONE NUMBER:
AGE:
RAILROAD LINE BEING USED:

| DATA ITEM | NAME | ADDRESS | PHONE NUMBER | AGE | RAILROAD LINE BEING USED | ... |
|---|---|---|---|---|---|---|
| DATA VALUE | | | | | | ... |
| PROVIDER COMPANY | ORGANIZATION Y | ORGANIZATION Y | ORGANIZATION Z | ORGANIZATION Z | ORGANIZATION X | ... |
| RELIABILITY LEVEL | 0.8 | 0.8 | 0.9 | 0.5 | 0.2 | ... |

DATA OUTPUT SCREEN — 1200

NAME: U

| DATA ITEM | NAME | ADDRESS | PHONE NUMBER | AGE | RAILROAD LINE BEING USED |
|---|---|---|---|---|---|
| DATA VALUE | | | | | |
| PROVIDER COMPANY | ORGANIZATION Y | ORGANIZATION Y | ORGANIZATION Z | ORGANIZATION Z | ORGANIZATION X |
| RELIABILITY LEVEL | 0.8 | 0.8 | 0.9 | 0.5 | 0.2 |
| | ... | ... | ... | ... | ... |

SYSTEM CONFIGURATION OF
INTER-ORGANIZATIONAL INFORMATION
LINKAGE PLATFORM

INFORMATION LINKAGE SYSTEM AND INFORMATION MANAGEMENT METHOD

CLAIM OF PRIORITY

The present application claims priority from Japanese patent application JP 2019-49187 filed on Mar. 15, 2019, the content of which is hereby incorporated by reference into this application.

BACKGROUND OF THE INVENTION

This invention relates to an information linkage system and an information management method, for linking information among organizations.

The trend toward using the vast amount of IoT data in the world to reduce costs and create new businesses is attracting widespread attention. Until now, organizations have tried to turn their own organization data or open data into value by using IT and IoT systems.

Moreover, in "Society 5.0", which is a concept of future society originated in Japan, there is advocated the concept of a "data linkage platform" for creating value by linking information held in various fields such as autonomous driving, infrastructure, agriculture, medical care, and finance. In response to this, there are widening efforts to create new businesses based on linkage of information across organizations in various fields. For example, in WO 2003/105002 A1, there is disclosed a system in which a person is authenticated and associated with personal information in a general-purpose manner.

In WO 2003/105002 A1, it is described that "Provided is a general-purpose system capable of authenticating people in an organization. The system is constructed of an on-line data processing system, for example, a WEB server, to be accessed from a user terminal, and an authentication body system coupled thereto via a network. The on-line data processing system includes electronic certificate receiving means for receiving an electronic certificate transmitted from the user terminal, and authentication means for authenticating the user by transmitting and receiving data to and from the authentication body system. The authentication body system includes an authentication database configured to store industry type identification data, such as a company code, and personal authentication data for authenticating a person in an organization by associating the industry and the person to each other. User authentication is performed based on authentication information, which is extracted from the authentication database, and includes at least information on an authority of the person in the organization" (see Abstract).

SUMMARY OF THE INVENTION

In the database described in WO 2003/105002 A1, there are limitations imposed on who is to register information, and hence registered information has a certain degree of accuracy, which allows users of information to use the information stored in the database equally.

Meanwhile, when information is linked across organizations, a plurality of organizations are allowed to update data, and information on the same person is provided by a plurality of organizations. The information provided by a plurality of organizations differs in the accuracy (reliability) of the information, which raises a problem in that it becomes difficult for the user of the information to select which information to use. This problem has not been solved only by employing the database described in WO 2003/105002 A1 for the following reason.

In the database described in WO 2003/105002 A1, there are limitations imposed on who is to register information, and hence no consideration has been given to determining the reliability level of information to provide an index for using the information.

Therefore, it has been desired to determine the reliability level of information provided by the plurality of organizations to provide an index for using the information.

The representative one of inventions disclosed in this application is outlined as follows. There is provided an information linkage system, which is configured to allow a plurality of organizations to register and update data, and is formed of a computer including: a calculation device configured to execute predetermined calculation processing, to thereby implement the following functional modules; and a storage device accessible to the calculation device, the information linkage system comprising: an information linkage control module configured to receive a registration request for data, an update request for data, and an acquisition request for data from a plurality of external systems; an information linkage database in which data is allowed to be registered and updated; an information linkage database access module configured to access the information linkage database in response to a request received by the information linkage control module; and a reliability calculation module configured to calculate reliability information relating to the data stored in the information linkage database.

According to at least one embodiment of this invention, the reliability level of information stored in a database can be provided to a user. Problems, configurations, and effects other than those described above are made clear based on the following description of at least one embodiment of this invention.

BRIEF DESCRIPTION OF THE DRAWINGS

The present invention can be appreciated by the description which follows in conjunction with the following figures, wherein:

FIG. 4A to FIG. 4C are each an explanatory diagram for showing an example of a DB table stored in the DB of each organization according to the embodiment;

FIG. 6 is a table for showing an example of a structure of the white list according to the embodiment;

FIG. 7 is a table for showing an example of another structure of the white list according to the embodiment;

FIG. 8 is a table for showing an example of another structure of the white list according to the embodiment;

FIG. 9 is a table for showing an example of data to be provided to the data user according to the embodiment;

FIG. 10 is a diagram for illustrating an example of a data output screen for providing the data to the data user according to the embodiment;

FIG. 11 is a table for showing another example of data to be provided to the data user according to the embodiment;

FIG. 12 is a diagram for illustrating another example of a data output screen for providing the data to the data user in at least one embodiment;

DETAILED DESCRIPTION OF THE PREFERRED EMBODIMENTS

At least one embodiment of this invention is now described with reference to the drawings.

The term "personal information" as used in at least one embodiment of this invention is defined as information on a living person in accordance with the revised Act on the Protection of Personal Information of Japan, and includes information that can be used to identify a specific person by name, date of birth, or other descriptions contained in the information, and a personal identification code (hereinafter referred to as "ID information"). In addition, in the personal information, key information to be used for authentication of a person to be authenticated in combination with ID information is defined as "authentication information".

Figure 1:
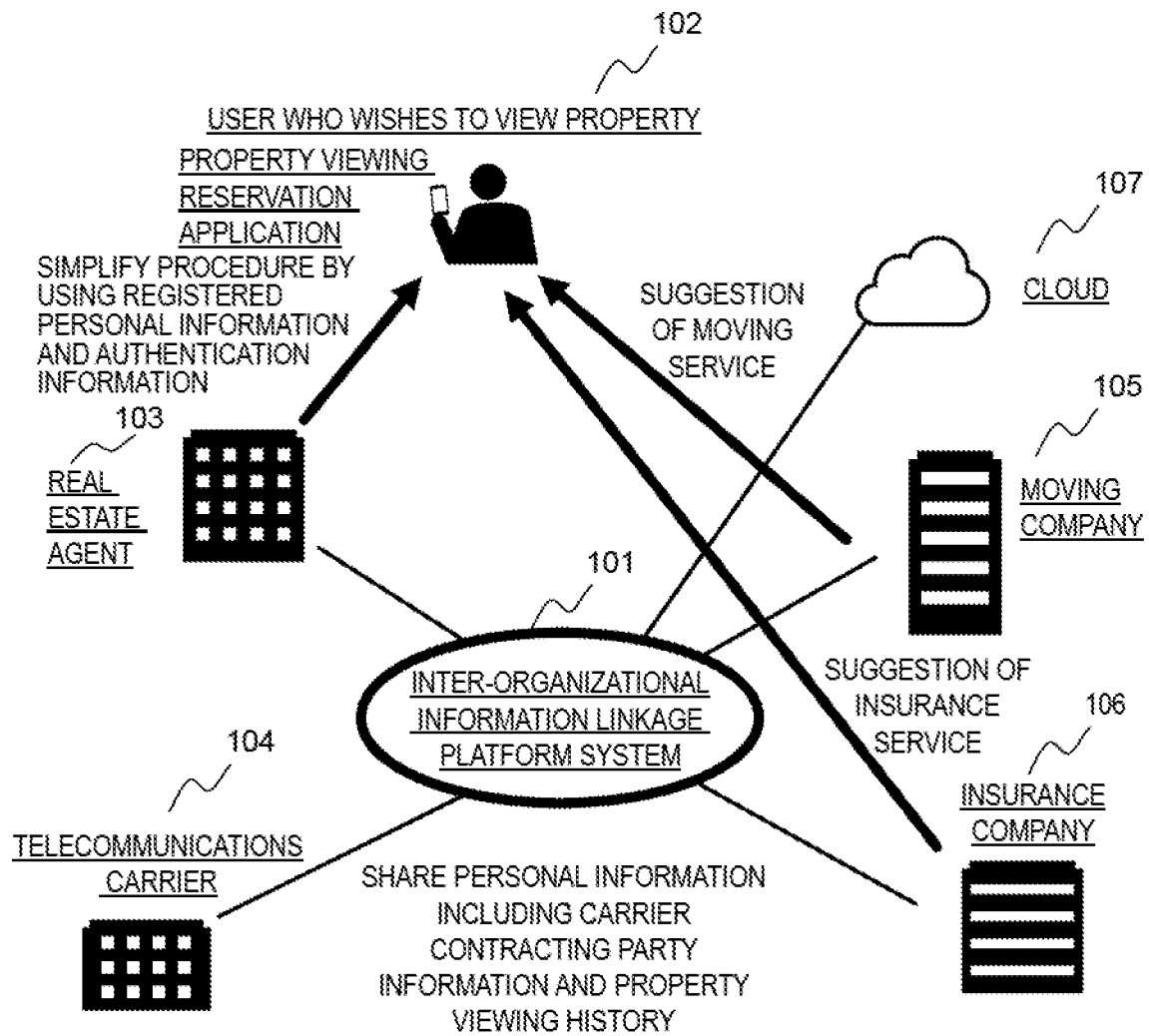
FIG. 1 is a diagram for illustrating a concept of an inter-organizational information linkage platform in an embodiment of this invention, in which a property viewing is used as an example.

FIG. 1 is a diagram for illustrating a concept of an inter-organizational information linkage platform in at least one embodiment of this invention, in which a property viewing is used as an example.

A real estate agent 103, a telecommunications carrier 104, a moving company 105, an insurance company 106, and other organizations having personal information on a cloud 107 link the personal information on a user via an inter-organizational information linkage platform system 101.

There is assumed a case in which a user 102 who has concluded a contract with the telecommunications carrier 104 and who wishes to view a property executes a property viewing reservation application provided by the real estate agent 103. The real estate agent 103 can simplify the conventional procedure, in which the user 102 who wishes to view the property visits the real estate shop and fills out a document with his or her personal information, by using personal information such as contracting party information and authentication information from the telecommunications carrier 104 to digitize the mechanism for identifying a person to be authenticated. Various services, such as a moving service and an insurance service, can be proposed at an appropriate timing in accordance with the needs of the user by linking information such as property viewing information and subsequent contract information with the moving company 105 and the insurance company 106. The real estate agent 103 can update the personal information to the newest possible state and increase the amount of personal information by linking the personal information with information from other organizations, and can thus lead to the creation of a new business.

In this way, through promoting information linkage among organizations and increasing the amount of personal information handled by the organizations, each organization linking the information can benefit from the creation of new businesses. The aim of this invention is to support and achieve situations in which such a virtuous cycle of information linkage promotion and business creation is born by using the inter-organizational information linkage platform system 101.

Those who link data via the inter-organizational information linkage platform system 101 may include social infrastructure service providers (including electric power companies, telecommunications carriers, gas companies, water utilities, and railroad companies) and administrative organs (including state organs and local public entities).

As the data provided to the inter-organizational information linkage platform system 101, only data by which an individual can be identified and whose use has been consented to by the individual who has provided the information is provided within a range to which the individual has consented.

Figure 2:
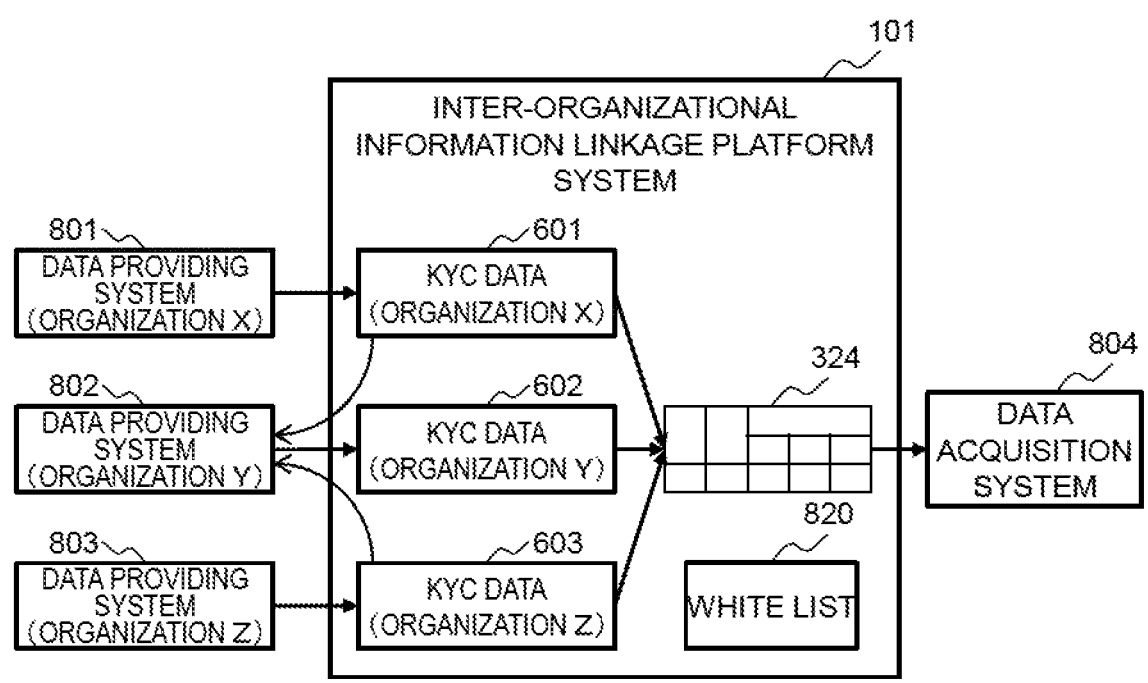
FIG. 2 is a block diagram for illustrating an example of a system configuration of the inter-organizational information linkage platform system according to the embodiment.

FIG. 2 is a block diagram for illustrating an example of a system configuration of the inter-organizational information linkage platform system 101 in at least one embodiment.

As illustrated in FIG. 2, the inter-organizational information linkage platform system 101 is coupled to data providing systems 801, 802, and 803, which are installed by data providers (including an organization X, an organization Y, and an organization Z), and a data acquisition system 804, which is installed by a data user. In FIG. 2, only one data acquisition system 804 is illustrated, but a plurality of data acquisition systems 804 may be coupled. In general, the data provider may be a data user because the data provider is able to use data. Meanwhile, the data user may be a data provider by providing data held by the data user himself/herself.

The data providing systems 801, 802, and 803 are computer systems configured to provide data to the inter-organizational information linkage platform system 101, and provide the inter-organizational information linkage platform system 101 with data tables 601, 602, and 603 held by the respective organizations, which are shown in FIG. 4A to FIG. 4C, respectively. The data tables 601, 602, and 603 provided by the data providing systems 801, 802, and 803 are managed by being integrated into an information linkage DB table 701 of an information linkage DB 324.

The inter-organizational information linkage platform system 101 stores, in the information linkage DB 324, the data (e.g., know your customer (KYC) data) provided by the data provider. A configuration of the information linkage DB 324 is described later with reference to FIG. 5.

In at least one embodiment, the KYC data stored in the information linkage DB 324 includes personal information (including a name, an address, and a phone number) that can identify an individual and information (including a railroad line being used, a purchase history, and a use status of a public service) relating to the behavior of the individual.

The inter-organizational information linkage platform system 101 calculates a reliability level relating to the data provided by the data provider, and records the calculated reliability level in a white list 820. In the white list 820, the reliability level may be determined for each provider as in the example shown in FIG. 6, may be determined for each provider and each data item as in the example shown in FIG. 7, and may be determined for each data item of data on each individual as in the example shown in FIG. 8. The reliability level recorded in the white list 820 is represented by a numerical value indicating the likelihood of each data, and is calculated based on, for example, a method of collecting the provided data, the use status of the provided data, and value of the provided data.

The white list 820 in at least one embodiment records a numerical value indicating how high the reliability level is, but may be configured as a blacklist for recording a numerical value indicating that how low the reliability level is.

The data acquisition system 804 is a computer configured to request data from the inter-organizational information linkage platform system 101. The inter-organizational information linkage platform system 101 reads out the data from the information linkage DB 324 in response to a request received from the data acquisition system 804, and attaches the reliability level recorded in the white list 820 to the data to transmit the data to the data acquisition system 804.

Modes of acquiring data by the data acquisition system 804 include the above-mentioned mode of acquiring data in response to the request received from the data acquisition system 804 and a mode of acquiring data when data that matches a condition defined for each data acquisition system 804 is transmitted to the data acquisition system 804 in a push format.

Figure 3:
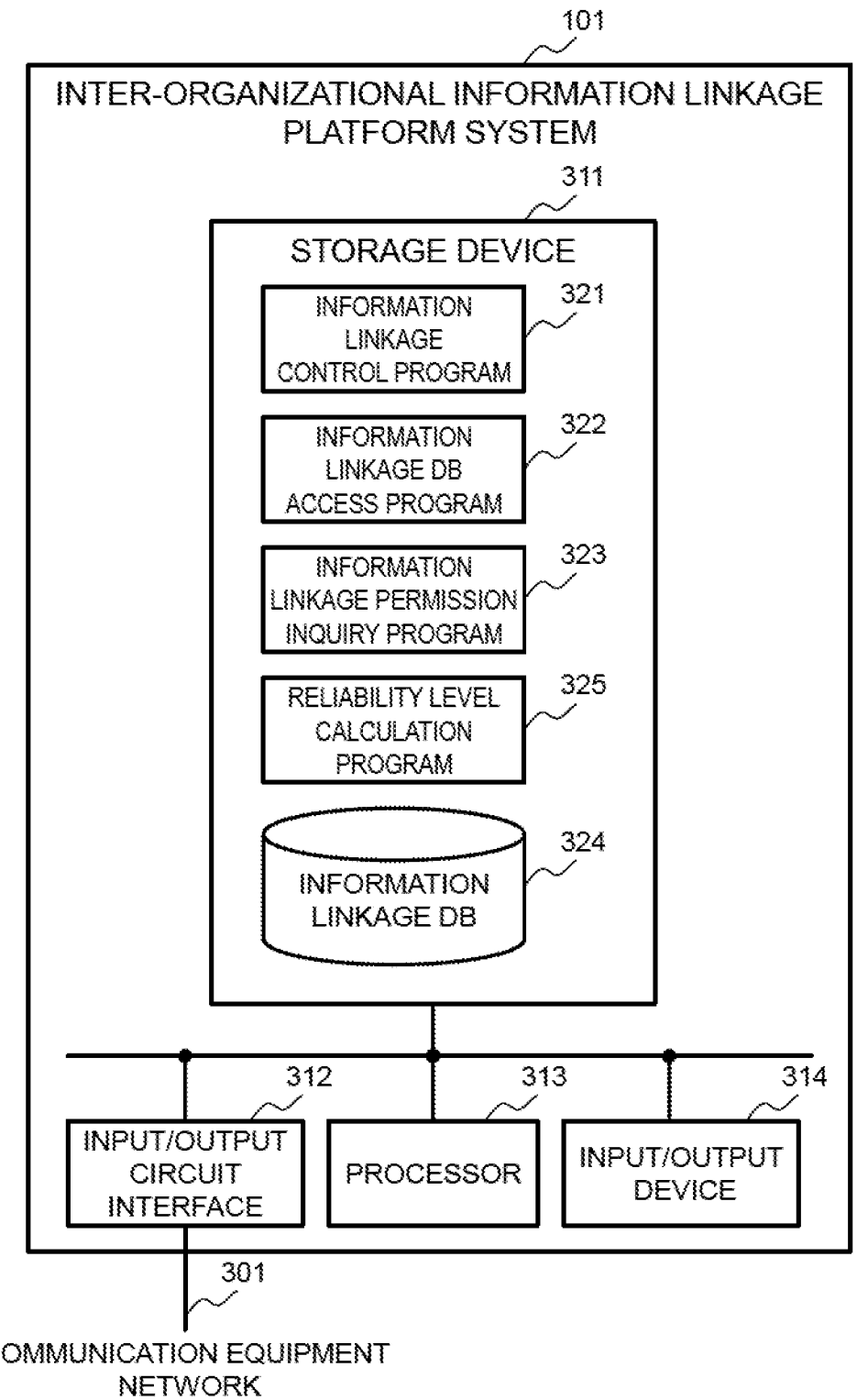
FIG. 3 is a block diagram for illustrating an example of hardware and functions included in the inter-organizational information linkage platform system according to the embodiment.

FIG. 3 is a block diagram for illustrating an example of hardware and functions included in the inter-organizational information linkage platform system 101 in at least one embodiment.

The inter-organizational information linkage platform system 101 includes an input/output circuit interface 312, a processor 313, an input/output device 314, a storage device 311, and an internal communication line (e.g., bus) configured to couple those components to each other.

The input/output circuit interface 312 is an interface for communicating to and from a communication equipment network 301. The communication equipment network 301 forms a network coupled to, for example, the data providing systems 801, 802, and 803 and the data acquisition system 804.

The processor 313 is a control device and a calculation device configured to execute programs stored in the storage device 311. A part of functions executed by the processor 313 may be executed by the calculation device (e.g., ASIC or FPGA) formed by hardware. The information linkage function of the inter-organizational information linkage platform system 101 is implemented by the processor 313 executing an information linkage control program 321, an information linkage DB access program 322, an information linkage permission inquiry program 323, and a reliability level calculation program 325, which are each stored in the storage device 311. In other words, the processing described below to be implemented by the information linkage control program 321, the information linkage DB access program 322, the information linkage permission inquiry program 323, and the reliability level calculation program 325 in the following description is actually executed by the processor 313 based on those programs.

The input/output device 314 is a device for receiving data inputs, outputting data, or receiving data inputs and outputting data. For example, the input/output device 314 receives an input from a keyboard or a mouse, and displays information from the processor 313 on a display.

The storage device 311 includes a volatile storage device (e.g., dynamic access random memory (DRAM)) and a nonvolatile storage device (e.g., hard disk drive (HDD) and solid state drive (SSD)).

The storage device 311 is configured to store the information linkage control program 321, the information linkage DB access program 322, the information linkage permission inquiry program 323, the reliability level calculation program 325, and the information linkage DB 324.

The programs to be executed by the processor 313 are provided to the inter-organizational information linkage platform system 101 via a removable medium (e.g., CD-ROM or flash memory) or the network, and are stored in the non-volatile storage device 311 being a non-transitory storage medium. Therefore, the inter-organizational information linkage platform system 101 may include an interface configured to read out data from a removable medium.

The inter-organizational information linkage platform system 101 is a computer system constructed from physically one computer or from a plurality of computers constructed logically or physically, or may operate on a virtual machine constructed from a plurality of physical computer resources. For example, the information linkage control program 321, the information linkage DB access program 322, the information linkage permission inquiry program 323, and the reliability level calculation program 325 may operate on a physical or logical computer separately provided for each thereof, or a plurality of programs of those may be combined to operate on one physical or logical computer.

The information linkage control program 321 is configured to control access from the data providing systems 801, 802, and 803 and the data acquisition system 804 based on commands from the data providing systems 801, 802, and 803 and the data acquisition system 804. In other words, the information linkage control program 321 receives the data provided from the data providing systems 801, 802, and 803. Meanwhile, the information linkage control program 321 returns data acquired from the information linkage DB 324 in response to the request received from the data acquisition system 804 by attaching reliability level data thereto as shown in FIG. 9. The information linkage control program 321 may also return data in response to the request received from the data acquisition system 804 by selecting the data acquired from the information linkage DB 324 by the reliability level as shown in FIG. 11.

The information linkage DB access program 322 is configured to control access to the information linkage DB 324, and execute processing such as addition of a data item to be linked, writing the data to be linked, referring to the data to be linked, and updating the data to be linked.

The information linkage permission inquiry program 323 is executed when permission to link the information to be linked is to be received from the user via the information linkage control program 321.

The information linkage DB 324 is used for storing data relating to individuals to be shared among organizations through linkage. The information linkage DB 324 is implemented by a centralized management type database that is held by only the inter-organizational information linkage platform system 101 to be accessed from the data acquisition system 804, but may be implemented by a distributed management type database held as a distributed ledger node among the organizations.

The reliability level calculation program 325 is configured to calculate the reliability level of the data stored in the information linkage DB 324. For the reliability level, a system administrator may set an initial value, or the reliability level calculation program 325 may calculate the initial value. The reliability level calculation program 325 may further update the reliability level based on how the system is being operated.

In at least one embodiment, as parameters for calculating the reliability level, there are used (1) an attribute of a data provider, (2) value of data, (3) an attribute of a data source, (4) a data acquisition date, (5) an actual survey, (6) information indicating whether a person relating to data has verified the data, and other such parameters can be used, and at least one of those parameters is used to calculate the reliability level. The reliability level calculation program 325 calculates the reliability level through use of a function using those parameters as arguments and a table for converting those parameters into the reliability level.

(1) The attribute of the data provider is determined based on the reliability level of the data provider itself. For example, identity verification is performed at the time of contract with a mobile phone carrier or a financial institution. Therefore, data on a user provided by each of those organizations is estimated to be correct, and the reliability level of the relevant organization can be determined to be high. Meanwhile, data provided by an organization that provides a service for which registration with a real name is not obligatory may include pseudonym data, and the reliability level of the relevant organization can be determined to be low.

(2) The value of the data is determined based on the monetary value of the data and the frequency of use thereof. The data provided at a high price via the inter-organizational information linkage platform system 101 is useful data, and can be determined to have a high reliability level, and hence the value of the data can be determined by a cumulative value obtained by multiplying the data price by the frequency of use. The data accessed frequently (accessed a large number of times or accessed by a large number of persons) is also useful data, and can be determined to have a high reliability level. In particular, the data (repeat data) of the type and data provider repeatedly used is useful data, and can be determined to have a higher reliability level. When the reliability level is updated based on the value of the data, it suffices to update the reliability level so that the reliability level increases for both the person who provides the data and the person who acquires the data.

(3) The attribute of the data source is determined based on the reliability level of source data from which the data has been acquired. For example, when the data has been validated through use of a driver's license or individual number card having a high reliability level, the data can be determined to have a high reliability level. In addition, the data provided by the data provider having a high reliability level can be determined to have a high reliability level.

(4) The data acquisition date is determined based on an elapsed time since the time of acquisition of the data. As time elapses since the time of the acquisition, the possibility that the data deviates from the actual data increases (e.g., the possibility that an address changes due to moving increases) to become stale, and hence the reliability level of the data decreases. In view of this, the reliability level may be lowered based on the elapsed time since the data acquisition date.

(5) As the actual survey, a survey is conducted through a visit by, for example, a district welfare officer or a municipality staff member, and when residence is successfully confirmed at a registered address, this address can be determined to have a high reliability level. In another case, when the residence is successfully confirmed at the registered address through home delivery or the delivery of registered mail, the address may be determined to have a high reliability level.

(6) In regard to the information indicating whether the person relating to data has verified the data, information input by the person relating to the data is considered to be more likely to be correct than information collected by a third party, and hence the reliability level of data can be determined to be high when, for example, the person relating to the data has registered the data in the system or the data registered in the system has been verified by the person relating to the data.

A degree of contribution of those parameters to the reliability level may be determined uniformly by the system, or the data user may determine a weighting factor for each parameter. When the weighting factor for the parameter is determined for each data user, data having an appropriate reliability level can be acquired based on the usage of the data.

Figure 5:
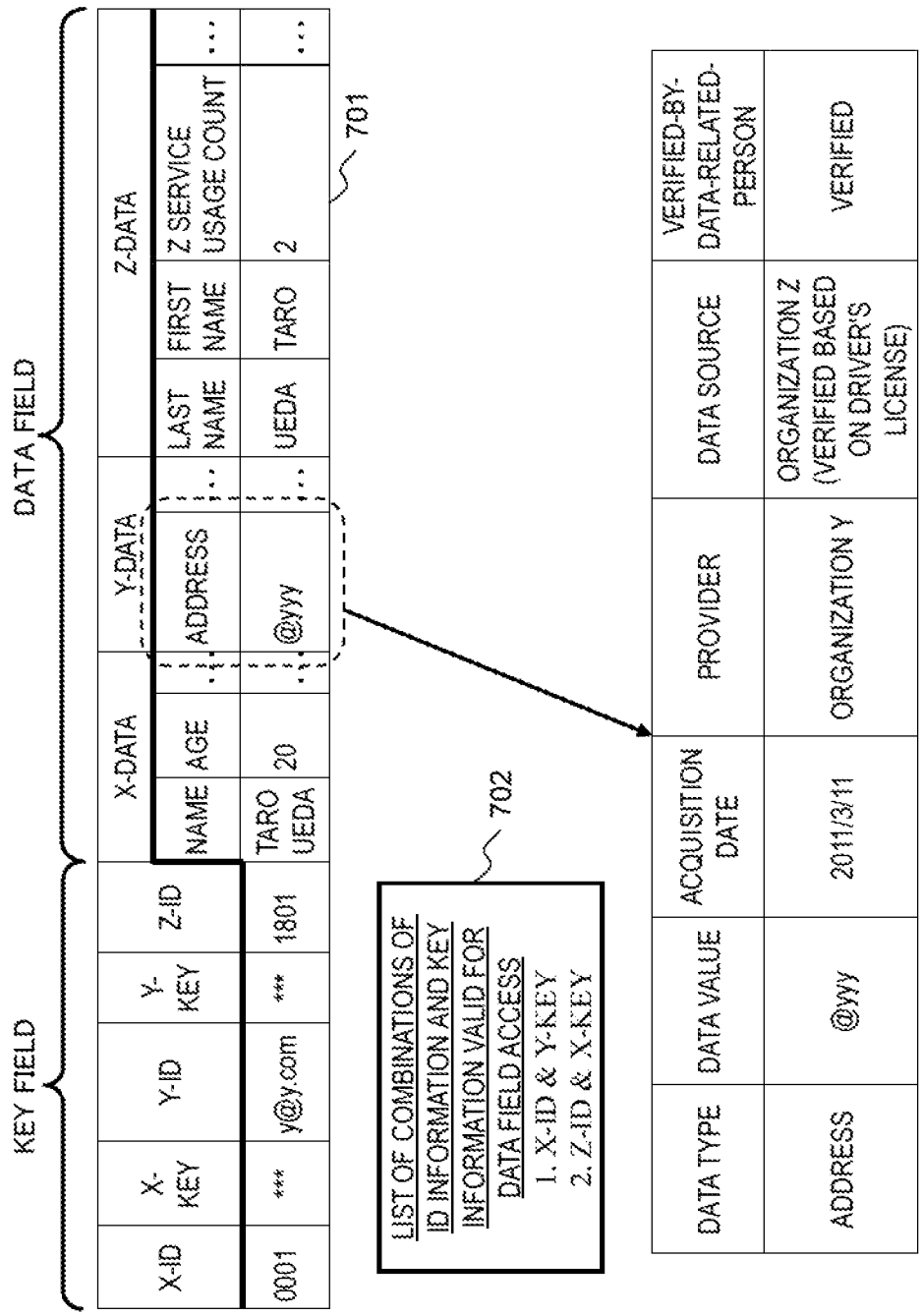
FIG. 5 is an explanatory diagram for showing an example of the information linkage DB table stored in the information linkage DB according to the embodiment.

FIG. 4A to FIG. 4C are each an explanatory diagram for showing an example of a DB table stored in the DB of each organization in at least one embodiment. FIG. 5 is an explanatory diagram for showing an example of the information linkage DB table stored in the information linkage DB 324 in at least one embodiment. This information linkage DB table is obtained by linking the DB table of each organization of FIG. 4A to FIG. 4C. FIG. 4A to FIG. 4C and FIG. 5 each show data on a user U, but data on a large number of persons are stored in the respective DBs. Further, all the users U in the respective tables shown in FIG. 4A to FIG. 4C and FIG. 5 are assumed to be the same person.

The data table 601 of the organization X shown in FIG. 4A is data provided from the data providing system 801, and has ID information and public key information along with data items including information on a name and an age.

The data table 602 of the organization Y shown in FIG. 4B is data provided from the data providing system 802, and has ID information and public key information along with data items including information on an address.

The data table 603 of the organization Z shown in FIG. 4C is data provided from the data providing system 803, and has ID information along with data items including information on a last name, a first name, and a Z service usage count.

An information linkage DB table 701 shown in FIG. 5 is obtained by linking all of the personal information held by the organizations X, Y, and Z. As key fields, ID information and public key information on the organization X, ID information and public key information on the organization Y, and ID information on the organization Z are stored. As data fields, the first name, the last name, and the age stored by the organization X, the address stored by the organization Y, and the last name, the first name, and the Z service usage count stored by the organization Z are stored.

In order to inquire about a data record in the information linkage DB table 701, any one of the key fields is selected and then the secret key paired with the public key of the selected key field is presented. When the organization X is selected, the record is identified based on the ID information on the organization X, then the secret key paired with the public key of the organization X is presented, and access to the data field is permitted only when decryption is successful.

It is not required that the ID information and the public key information relate to one organization. For example, permission to access a data field may be issued by presenting the secret information corresponding to the ID information on the organization Z and the public key information on the organization Y. Permission to access a data field may also be issued based on any combination of all the registered ID information and the secret keys corresponding to all the public key information. A list 702 of the combinations of the ID information and the key information valid for data field access may be provided in advance, and permission to access a data field may be issued in accordance with the list 702.

The example of the combination list 702 of FIG. 5 is also valid for a combination of the ID of a user in the organization X and the secret key assigned to the user in the organization Y, and the ID of the user in the organization Z and the secret key assigned to the user in the organization X (i.e., access to the applicable data field is permitted even when such a combination is input).

In the information linkage DB table 701, the public key and the secret key may not be required to be set.

As shown in the lower part of FIG. 5, the respective pieces of data in the data fields of the information linkage DB table 701 include a data type, a data value, an acquisition date, a provider, a data source, and a verified-by-data-related-person flag. In the data shown in FIG. 5, the data type is an address, the acquisition date is a date on which the relevant piece of data was acquired, the provider is a person who has provided the relevant piece of data to the inter-organizational information linkage platform system 101, the data source is an acquisition source of the relevant piece of data (organization or document relating to primary acquisition), and the verified-by-data-related-person flag is data indicating whether the relevant piece of data has been verified or input by the person relating to the data.

FIG. 6 is a table for showing an example of a structure of the white list 820 in at least one embodiment. In the white list 820 shown in FIG. 6, the reliability level of data is determined for each provider. The reliability level of the data for each provider may be determined by the attribute of the provider, or may be updated as the value of the data changes in accordance with the operation of the system or as time elapses.

FIG. 7 is a table for showing an example of another structure of the white list 820 in at least one embodiment. In the white list 820 shown in FIG. 7, the reliability level of data is determined for each provider and data item. The reliability level of the data may have a given initial value determined for each provider and each data item, or may be updated as the value of the data changes in accordance with the operation of the system or as time elapses.

FIG. 8 is a table for showing an example of another structure of the white list 820 in at least one embodiment. In the white list 820 shown in FIG. 8, the reliability level of the data is determined for each data item of data on each individual. The white list 820 shown in FIG. 8 includes the reliability level in a part of the data stored in the information linkage DB 324, and is integrated into a part of the information linkage DB 324. The reliability level of the data may have an initial value determined for each provider and each data item, or may be updated as the value of the data changes in accordance with the operation of the system or as time elapses.

FIG. 9 is a table for showing an example of data to be provided to the data user in at least one embodiment.

The information linkage control program 321 returns the data acquired from the information linkage DB 324 to the data acquisition system 804 in response to the request received from the data acquisition system 804 by attaching the reliability level data thereto. For example, when the data acquisition system 804 requests the personal information on the user U, the information linkage control program 321 requests the information linkage DB access program 322 for a data search. The information linkage DB access program 322 creates a data search query, reads out data corresponding to the query from the information linkage DB 324, and transmits the data to the information linkage control program 321. The information linkage control program 321 returns the data read out from the information linkage DB 324 to the data acquisition system 804 by attaching the reliability level data thereto.

FIG. 10 is a diagram for illustrating an example of a data output screen 1000 for providing the data to the data user in at least one embodiment.

On the data output screen 1000, the data on the user U requested by the data acquisition system 804 is displayed. The data on the user U is provided by a plurality of providers (organization X, organization Y, and organization Z), and the reliability level of the information differs depending on the provider. For this reason, the data output screen 1000 assists the data user in selecting the data by displaying the reliability level of the data on the user U requested by the data acquisition system 804.

FIG. 11 is a table for showing another example of data to be provided to the data user in at least one embodiment.

The information linkage control program 321 returns the data to the data acquisition system 804 in response to the request received from the data acquisition system 804 by selecting the data acquired from the information linkage DB 324 by the reliability level. For example, when the data acquisition system 804 requests the personal information on the user U, the information linkage control program 321 requests the information linkage DB access program 322 for a data search. The information linkage DB access program 322 creates a data search query, reads out data corresponding to the query from the information linkage DB 324, and transmits the data to the information linkage control program 321. The information linkage control program 321 selects data having a high reliability level from the data read out from the information linkage DB 324, and returns the selected data to the data acquisition system 804.

FIG. 12 is a diagram for illustrating another example of a data output screen 1200 for providing the data to the data user in at least one embodiment.

On the data output screen 1200, the data on the user U requested by the data acquisition system 804 is displayed. The data on the user U is provided by the plurality of providers (organization X, organization Y, and organization Z), and the reliability level of the information differs depending on the provider, and hence it suffices that information having a high reliability level is selected and presented to the data user. Therefore, on the data output screen 1200, pieces of data provided by the organization Y are selected as the name and the address, pieces of data provided by the organization Y are selected as the phone number and the age, and a piece of data provided by the organization X is selected as a railroad line being used.

Figure 13:
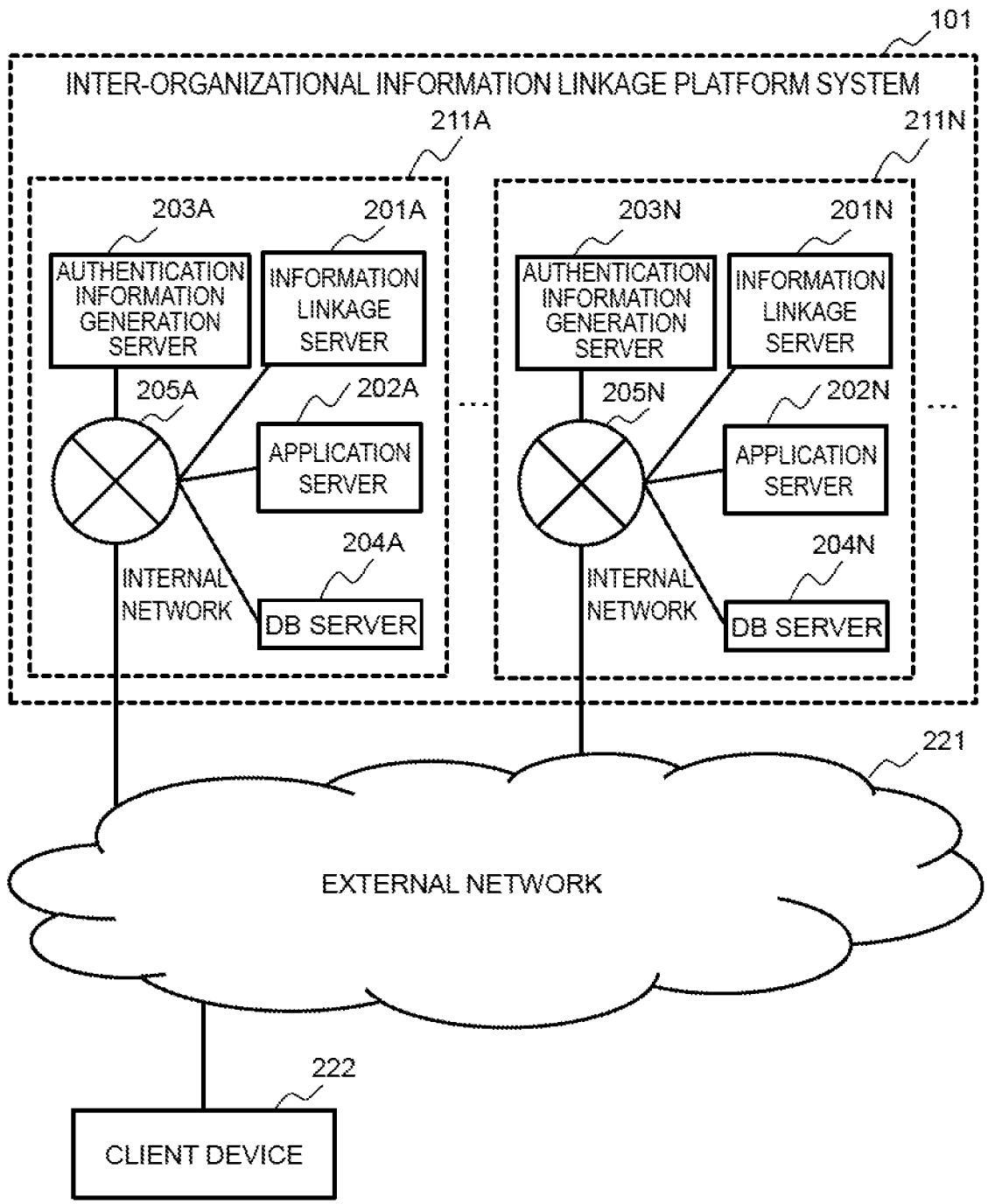
FIG. 13 is a block diagram for illustrating an example of a system configuration of the inter-organizational information linkage platform system according to the embodiment.

There is now described another configuration of the inter-organizational information linkage platform system 101. FIG. 13 is a block diagram for illustrating an example of a system configuration of the inter-organizational information linkage platform system 101 in at least one embodiment.

As illustrated in FIG. 13, the inter-organizational information linkage platform system 101 includes a plurality of business operator systems 211 coupled to an external network 221. Each business operator system 211 includes an information linkage server 201, an application server 202, an authentication information generation server 203, and a database (DB) server 204, which are coupled to each other via an internal network 205.

In FIG. 13, business operator systems 211A and 211N are illustrated as examples of the plurality of business operator systems 211, but the inter-organizational information linkage platform system 101 may actually include more business operator systems. Each of the business operator systems 211A and 211N is a system to be used by, for example, the various business operators (i.e., organizations) such as the real estate agent 103, the telecommunications carrier 104, the moving company 105, and the insurance company 106 illustrated in FIG. 1. The business operator systems 211A and 211N may each be implemented by hardware independent from each other, or may be implemented on the cloud 107. In the following description, when the description is common to both the business operator systems 211A and 211N, those systems are collectively referred to as "business operator system 211". The reference symbols of each server and network in the business operator system 211 are handled in the same manner.

The information linkage server 201 is configured to execute, via the external network 221, processing and communication such as agreement of the information linkage target data with the information linkage server 201 of another organization (i.e., the information linkage server 201 included in a business operator system 211 different from the business operator system 211 including that information linkage server 201), an information linkage permission inquiry to a client device 222 of the user, and an information linkage start notification to and from the information linkage server of the another organization. The information linkage server 201 is also configured to receive, via the internal network 205, an information linkage request from the application server 202, to request the authentication information generation server 203 to generate authentication information, and to issue an inquiry to the DB server 204 of the own organization (i.e., the DB server 204 included in the business operator system 211 including that information linkage server 201).

The application server 202 is configured to receive and execute processing on an arbitrary application execution request via the client device 222 of the user or a device in the organization. In at least one embodiment, it is assumed that the above-mentioned arbitrary application issues an inquiry about personal information to the information linkage server 201.

The authentication information generation server 203 is configured to generate, in response to a request received from the information linkage server 201, authentication information to be used for authentication of a person to be authenticated, and pass on the generated authentication information to the information linkage server 201. The authentication information may be any information such as a password, a public key, or a public key corresponding to biometric authentication (e.g., face image identification, fingerprint authentication, and vein authentication). Information having a required authentication strength is selected to be used as the authentication information.

The DB server 204 is configured to store data originally held by the own organization. The DB server 204 is referred to when the user data is first entered into the information linkage DB 324.

The external network 221 is a communication equipment network for communication among organizations and communication to and from the client device 222 of the user. The internal network 205 is a communication equipment network for communicating within an organization. The communication equipment network of the external network 221 and the communication equipment network of the internal network 205 are, for example, the Internet, an intranet, or a wired or wireless local area network (LAN) or a wide area network (WAN).

The information linkage server 201, the application server 202, the authentication information generation server 203, and the DB server 204 may each be a server apparatus constructed from a physical computer, or may be constructed from a virtual machine. Each of those servers may be constructed from a plurality of servers for distributed execution.

The role of each server apparatus may be mixed, and a part or all of the servers may be included in one apparatus. For example, the information linkage server 201 and the application server 202 may be constructed on a single physical server or virtual server.

Figure 14:
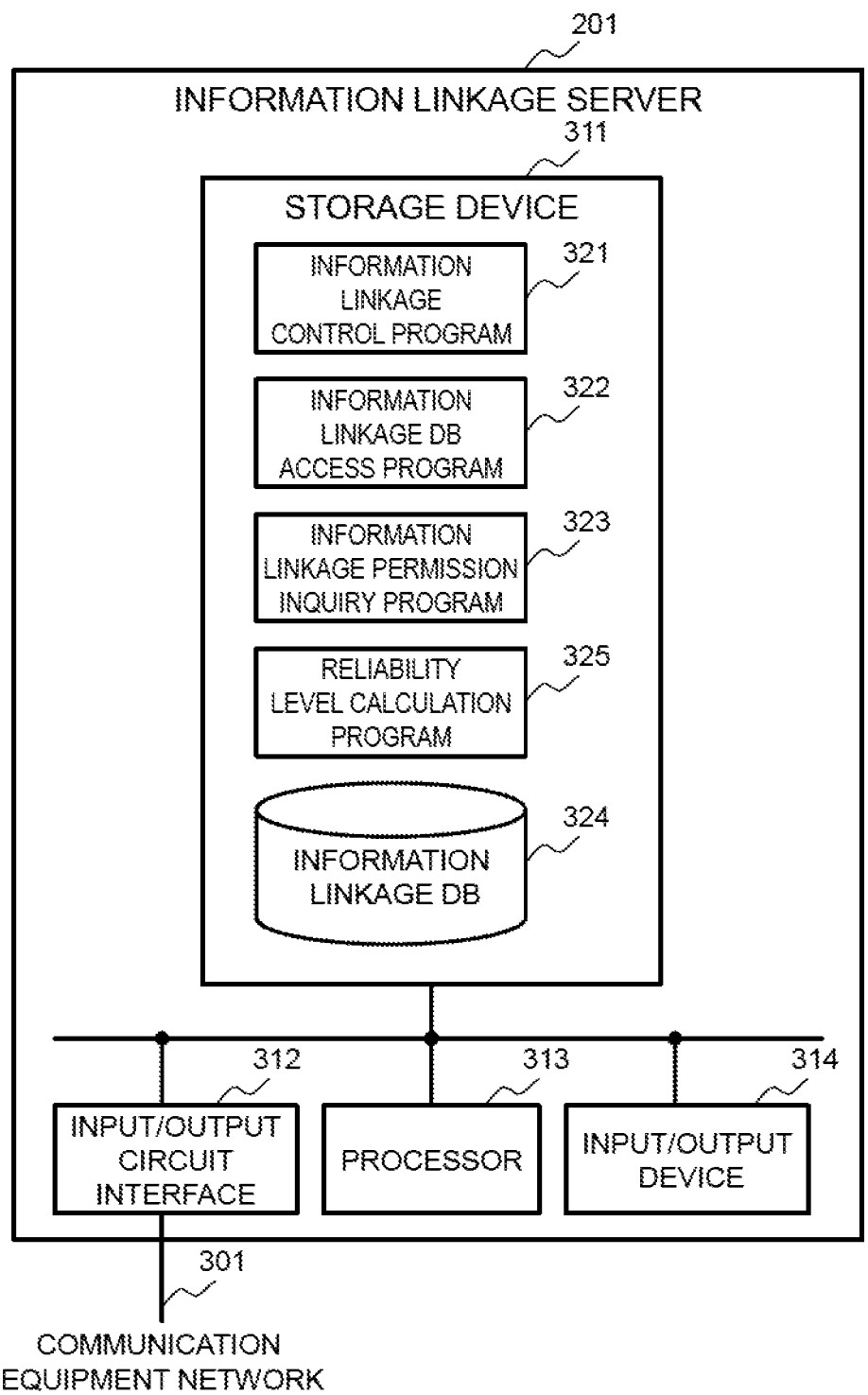
FIG. 14 is a block diagram for illustrating an example of hardware and functions included in the information linkage server according to the embodiment.

FIG. 14 is a block diagram for illustrating an example of hardware and functions included in the information linkage server 201 in at least one embodiment.

The information linkage server 201 includes an input/output circuit interface 312, a processor 313, an input/output device 314, a storage device 311, and an internal communication line (e.g., bus) configured to couple those components to each other.

The input/output circuit interface 312 is an interface for communicating to and from a communication equipment network 301. The communication equipment network 301 is used to construct the internal network 205, for example.

The processor 313 is a control device and a calculation device configured to execute programs stored in the storage device 311. A part of functions executed by the processor 313 may be executed by the calculation device (e.g., ASIC or FPGA) formed by hardware. The information linkage function of the information linkage server 201 is implemented by the processor 313 executing the information linkage control program 321, the information linkage DB access program 322, the information linkage permission inquiry program 323, and the reliability level calculation program 325, which are each stored in the storage device 311. In other words, the processing described below to be implemented by the information linkage control program 321, the information linkage DB access program 322, the information linkage permission inquiry program 323, and the reliability level calculation program 325 in the following description is actually executed by the processor 313 based on those programs.

The input/output device 314 is a device for receiving data inputs, outputting data, or receiving data inputs and outputting data. For example, the input/output device 314 receives an input from a keyboard or a mouse, and displays information from the processor 313 on a display.

The storage device 311 includes a volatile storage device (e.g., dynamic access random memory (DRAM)) and a nonvolatile storage device (e.g., hard disk drive (HDD) and solid state drive (SSD)).

The storage device 311 is configured to store the information linkage control program 321, the information linkage DB access program 322, the information linkage permission inquiry program 323, the information linkage DB 324, and the reliability level calculation program 325.

The information linkage control program 321 is configured to start information linkage based on, for example, a call from the information linkage control program 321 of another organization via the external network 221, a call from an arbitrary service application, or a call from a command via the input/output device 314. Specifically, the information linkage control program 321 implements processing of notifying data to be linked among organizations, processing of permitting information linkage in response to such notification, or processing of, when there is an information linkage request received from the user via an application, issuing a request to the information linkage DB inquiry program 323 and the information linkage DB access program 322 to perform the processing, and adding data to the information linkage DB, referring to the data of the information linkage DB, and returning a result of update of the information linkage DB.

The information linkage DB access program 322 is configured to control the access to the information linkage DB 324, and execute processing such as addition of a data item to be linked, writing the data to be linked, referring to the data to be linked, and updating the data to be linked.

The information linkage permission inquiry program 323 is called when it is required to receive, from the user, permission to link the information to be linked via the information linkage control program 321. The information linkage permission inquiry program 323 is configured to, as an application, display, on the client device 222 of the user, the data item to be linked and request an answer regarding whether or not the information may be linked.

The reliability level calculation program 325 is configured to calculate the reliability level of the data stored in the information linkage DB 324. For the reliability level, a system administrator may set an initial value, or the reliability level calculation program 325 may calculate the initial value. The reliability level calculation program 325 may further update the reliability level based on how the system is being operated.

The information linkage DB 324 is used for storing personal information to be shared among organizations. The data stored in the information linkage DB 324 is required to be the same regardless of which organization acquires the data. For this reason, the information linkage DB 324 is implemented by a centralized management type database that is held by only one organization to be accessed from other organizations, or a distributed management type database stored as a distributed ledger node among the organizations. The information linkage DB 324 is the information linkage DB table shown in FIG. 5, and is obtained by linking the DB tables stored in the DBs of the respective organizations shown in FIG. 4A to FIG. 4C.

Figure 15:
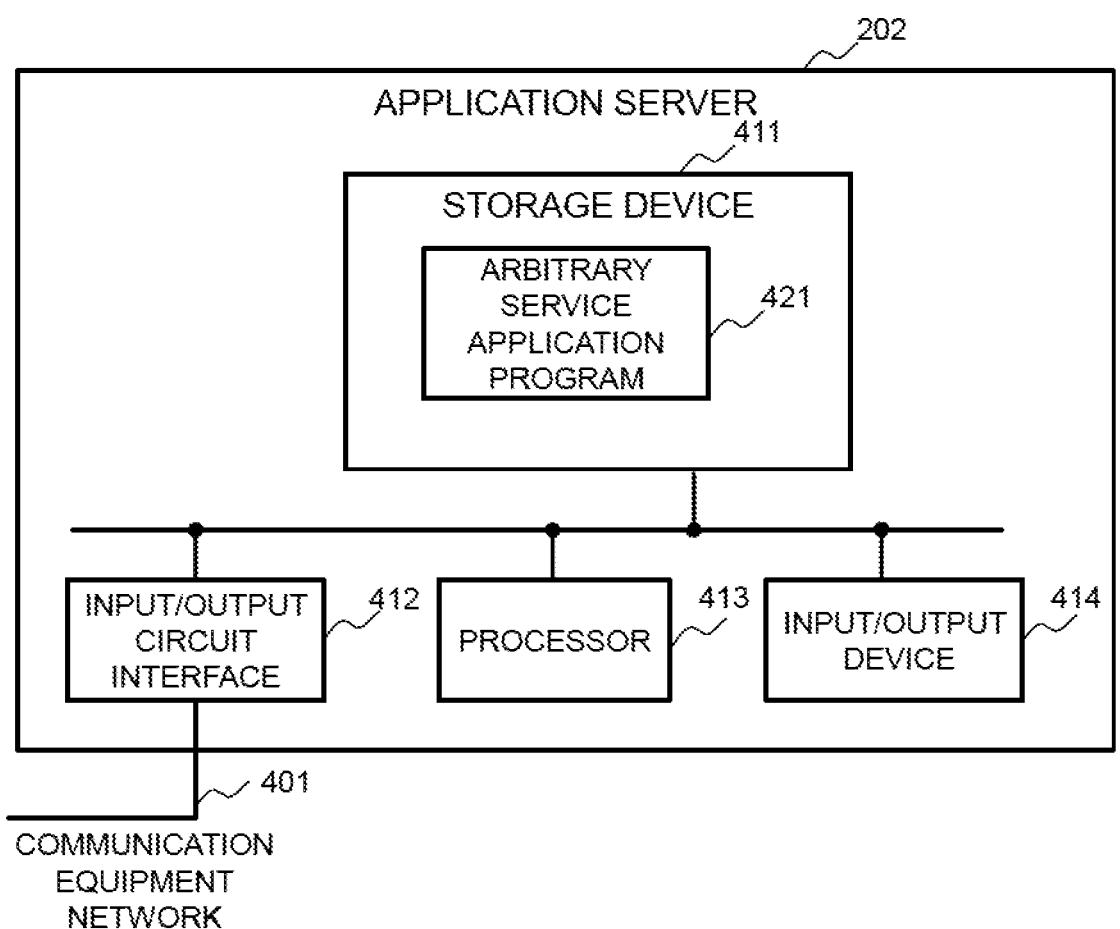
FIG. 15 is a block diagram for illustrating an example of hardware and functions to be included in the application server according to the embodiment.

FIG. 15 is a block diagram for illustrating an example of hardware and functions to be included in the application server 202 in at least one embodiment.

The application server 202 includes an input/output circuit interface 412, a processor 413, an input/output device 414, a storage device 411, and an internal communication line (e.g., bus) configured to couple those components to each other.

The input/output circuit interface 412 is an interface for communicating to and from a communication equipment network 401. The communication equipment network 401 is used to construct the internal network 205, for example.

The processor 413 is a control device and a calculation device configured to execute programs stored in the storage device 411. A part of functions executed by the processor 413 may be executed by the calculation device (e.g., ASIC or FPGA) formed by hardware. An arbitrary service of the application server 202 is implemented when the processor 413 executes an arbitrary service application program 421 stored in the storage device 411. In other words, the processing to be implemented by the arbitrary service application program 421 in the following description is actually executed by the processor 413 based on the arbitrary service application program 421.

The input/output device 414 is a device for receiving data inputs, outputting data, or receiving data inputs and outputting data. For example, the input/output device 414 receives an input from a keyboard or a mouse, and displays information from the processor 413 on a display.

The storage device 411 includes a volatile storage device (e.g., DRAM) and a nonvolatile storage device (e.g., HDD and SSD).

The storage device 411 is configured to store the arbitrary service application program 421.

In at least one embodiment, the arbitrary service application program 421 is a program for accessing the linked data to implement arbitrary processing while identifying a person and referring to and updating the required information. In the example of property viewing described with reference to FIG. 1, the property viewing reservation application corresponds to the arbitrary service application 421.

Figure 16:
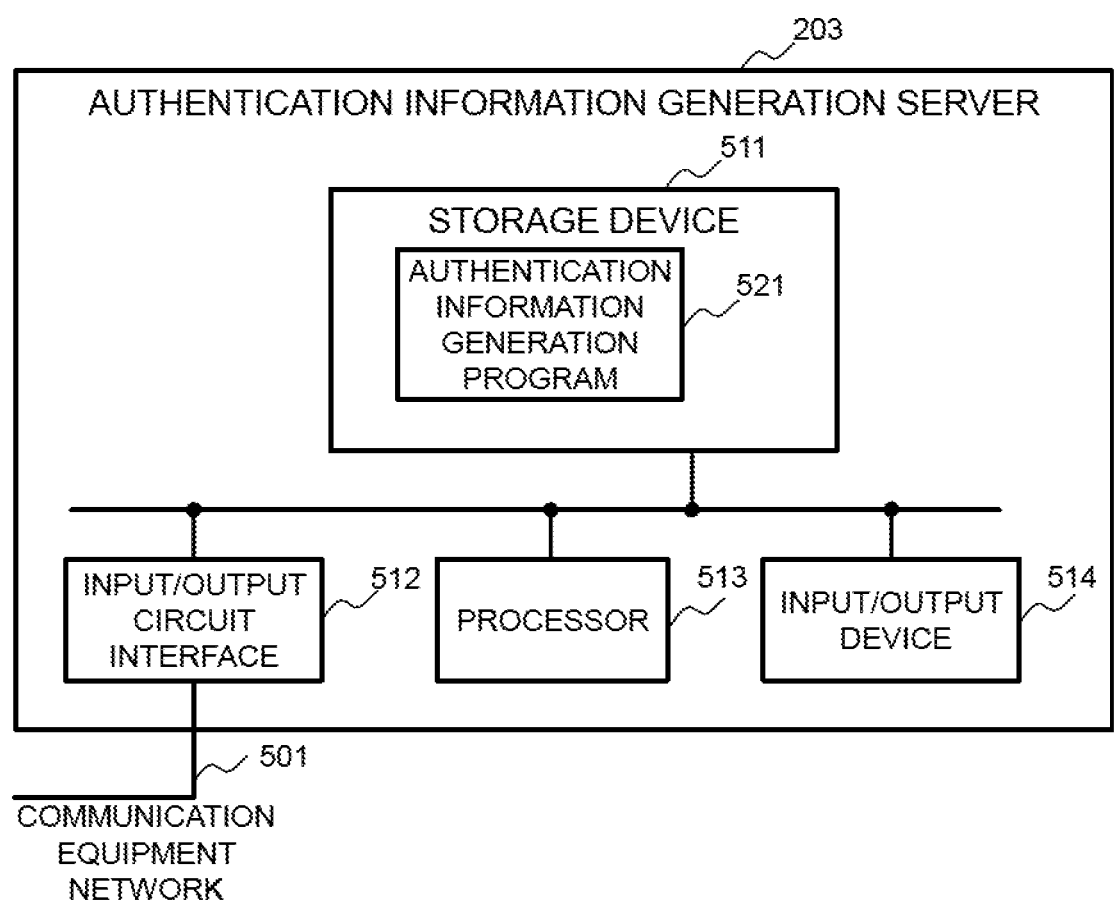
FIG. 16 is a block diagram for illustrating an example of hardware and functions included in the authentication information generation server according to the embodiment.

FIG. 16 is a block diagram for illustrating an example of hardware and functions included in the authentication information generation server 203 in at least one embodiment.

The authentication information generation server 203 includes an input/output circuit interface 512, a processor 513, an input/output device 514, a storage device 511, and an internal communication line (e.g., bus) configured to couple those components to each other.

The input/output circuit interface 512 is an interface for communicating to and from a communication equipment network 501. The communication equipment network 501 is used to construct the internal network 205, for example.

The processor 513 is a control device and a calculation device configured to execute programs stored in the storage device 511. A part of functions executed by the processor 513 may be executed by the calculation device (e.g., ASIC or FPGA) formed by hardware. Generation of authentication information is implemented when the processor 513 executes an authentication information generation program 521 stored in the storage device 511. In other words, the processing to be implemented by the authentication information generation program 521 in the following description is actually executed by the processor 513 based on the authentication information generation program 521.

The input/output device 514 is a device for receiving data inputs, outputting data, or receiving data inputs and outputting data. For example, the input/output device 514 receives an input from a keyboard or a mouse, and displays information from the processor 513 on a display.

The storage device 511 includes a volatile storage device (e.g., DRAM) and a nonvolatile storage device (e.g., HDD and SSD).

The storage device 511 is configured to store the authentication information generation program 521.

The authentication information generation program 521 is configured to generate authentication information. The authentication information may be any information such as a password, a public key, or a public key corresponding to biometric authentication (e.g., face image identification, fingerprint authentication, and vein authentication). Information having a required authentication strength is selected to be used as the authentication information. For example, in the case of biometric authentication, the authentication information generation program 521 generates a public key for which the biometric authentication serves as a secret key. In such a case, the authentication information generation program 521 requests the user to input information as required, and generates the public key based on the input.

As described above, at least one embodiment of this invention includes: an information linkage control module (information linkage control program 321) configured to receive a registration request for data, an update request for data, and an acquisition request for data from a plurality of external systems; the data information linkage database 324 in which data is allowed to be registered and updated; an information linkage database access module (information linkage database access program 322) configured to access the information linkage database 324 in response to a request received by the information linkage control module 321; and a reliability calculation module (reliability level calculation program 325) configured to calculate reliability information relating to data stored in the information linkage database 324. Accordingly, it is possible to determine the reliability level of data provided from a plurality of organizations to provide a user with an index for using the data.

Further, the reliability calculation module 325 calculates the reliability information through use of the attribute of the organization that has provided the data stored in the information linkage database 324, and hence a high reliability level can be given to the organization in which identity verification is performed at the time of contract or another such organization having highly accurate information.

Further, the reliability calculation module 325 calculates the reliability information through use of the value of the data stored in the information linkage database 324, and hence high reliability can be given to the information having high monetary value or frequently used information.

Further, the reliability calculation module 325 calculates the reliability information through use of the reliability level of the source data of the data stored in the information linkage database 324, and hence a high reliability level can be given to the information acquired based on information having a high reliability level or the information provided by the data provider having a high reliability level.

Further, the reliability calculation module 325 calculates the reliability information through use of the elapsed time since the data stored in the information linkage database 324 is acquired, and hence the reliability level can be given in consideration of data becoming stale as time elapses.

Further, the reliability calculation module 325 calculates the reliability information through use of a result of the actual survey relating to the data stored in the information linkage database 324, and hence the reliability level can be positively given.

Further, the reliability calculation module 325 calculates the reliability information through use of information indicating whether the data stored in the information linkage database 324 has been verified by a person relating to the data, and hence the reliability level can be positively given.

Further, the reliability calculation module 325 determines the reliability information for each organization that has provided the data stored in the information linkage database 324, and hence the reliability level can be given with a small amount of calculation based on the attribute of the organization (e.g., whether the organization has high accuracy information).

Further, the reliability calculation module 325 determines the reliability information for each organization that has provided the data stored in the information linkage database 324 and each data item of the data stored in the information linkage database 324, and hence the reliability level can be given in consideration of which information type each organization is strong or weak for (e.g., the phone number of a mobile phone carrier has high accuracy, while the accuracy of the address decreases with a lapse of time).

Further, the reliability calculation module 325 determines the reliability information for each piece of data stored in the information linkage database 324, and hence a detailed reliability level can be given in consideration of the characteristics of each user, the organization that has provided the information, and the data item.

Further, the information linkage control module 321 outputs the data read out from the information linkage database 324 by attaching the reliability information thereto, and hence it is possible to provide the user with an index for using the data.

Further, the information linkage control module 321 outputs data selected in accordance with the reliability information from the data read out from the information linkage database 324, and hence it is possible to provide the user with data having a high reliability level.

What is claimed is:

1. An information linkage system, which is configured to allow a plurality of organizations to register and update personal information, comprising:
 a plurality of business operator systems assigned to the plurality of organizations and coupled via an external network and configured to communicate with a client device of a user, each of the business operator systems comprising:
  an application server configured to receive an arbitrary application execution request from the client device via the external network and issue a personal information inquiry;
  an information linkage server configured to receive the personal information inquiry from the application server and generate an authentication request;
  an authentication information generation server configured to generate, in response to the authentication request received from the information linkage server, authentication information and transmit the authentication information to the information linkage server, and
  an internal network communicably coupling each of the servers, wherein the information linkage server comprises:
   an information linkage database storing personal information that is allowed to be registered and updated;
   a processor; and
   a storage device coupled to the processor and storing instructions executable by the processor to cause the information linkage system to implement:
    an information linkage control module configured to receive from the plurality of business operator systems:
     a registration request for personal information,
     an update request for personal information, and
     an acquisition request for personal information from the plurality of business operator systems via the external network;
    an information linkage database access module configured to access the information linkage database in response to a request received by the information linkage control module;
    an information linkage permission inquiry module configured to communicate an information linkage permission inquiry and receive an information linkage permission to and from the client device via the external network; and a reliability calculation module configured to calculate reliability information relating to the personal information stored in the information linkage database.

2. The information linkage system according to claim 1, wherein the reliability calculation module is configured to calculate the reliability information through use of at least one of:
- an attribute of each of the plurality of business operator systems that has provided the personal information stored in the information linkage database;
- value of the personal information stored in the information linkage database;
- a reliability level of source data of the personal information stored in the information linkage database;
- an elapsed time since the personal information stored in the information linkage database is acquired;
- a result of an actual survey relating to the personal information stored in the information linkage database; or
- information indicating whether the personal information stored in the information linkage database has been verified by a person relating to the personal information.

3. The information linkage system according to claim 1, wherein the reliability calculation module is configured to determine the reliability information for each of the plurality of business operator systems that has provided the personal information stored in the information linkage database.

4. The information linkage system according to claim 1, wherein the reliability calculation module is configured to determine the reliability information for each of the plurality of business operator systems that has provided the personal information stored in the information linkage database and for each data item of the personal information stored in the information linkage database.

5. The information linkage system according to claim 1, wherein the reliability calculation module is configured to determine the reliability information for each piece of data stored in the information linkage database.

6. The information linkage system according to claim 1, wherein the information linkage control module is configured to output the personal information read out from the information linkage database by attaching the reliability information thereto.

7. The information linkage system according to claim 1, wherein the information linkage control module is configured to output data selected in accordance with the reliability information from the persona information read out from the information linkage database.

8. An information management method for an information linkage system,
the information linkage system being configured to allow a plurality of organizations to register and update personal information using a plurality of respective assigned business operator systems coupled via an external network to communicate with a client device of a user, each of the business operator systems comprising an application server, an information linkage server, an authentication information generation server and an internal network communicably coupling each of the servers, wherein the information linkage server includes a processor and a storage device coupled to the processor and configured to store an information linkage database including personal information that is allowed to be registered and updated, the information management method comprising:
- receiving, via the application server, an arbitrary application execution request from the client device via the external network and issuing a personal information inquiry to the information linkage server;
- receiving, via the information linkage server, the personal information inquiry;
- generating, via the information linkage server, an authentication request;
- transmitting, via the information linkage server, the authentication request to the authentication information generation server;
- generating, via the authentication information generation server, authentication information in response to the authentication request;
- transmitting, via the authentication information generation server, the authentication information to the information linkage server;
- receiving, by the processor, a registration request for personal information, an update request for personal information, and an acquisition request for personal information from the plurality of business operator systems via the external network;
- accessing, by the processor, the information linkage database in response to a request received in the information linkage control step;
- communicating, by the processor, an information linkage permission inquiry to the client device and receiving an information linkage permission from the client device via the external network; and
- a reliability calculation step of calculating, by the processor, reliability information relating to the personal information stored in the information linkage database.

9. The information management method according to claim 8, wherein the reliability calculation step includes calculating, by the processor, the reliability information through use of at least one of:
- an attribute of each of the plurality of business operator systems that have provided the personal information stored in the information linkage database;
- value of the personal information stored in the information linkage database;
- an elapsed time since the personal information stored in the information linkage database is acquired;
- a reliability level of source data of the personal information dam-stored in the information linkage database;
- a result of an actual survey relating to the personal information data-stored in the information linkage database; or
- information indicating whether the personal information stored in the information linkage database has been verified by a person relating to the personal information.

* * * * *